(12) United States Patent
Neal

(10) Patent No.: US 6,911,166 B2
(45) Date of Patent: Jun. 28, 2005

(54) METHOD OF ENCAPSULATING HARD DISC DRIVE AND OTHER ELECTRICAL COMPONENTS

(75) Inventor: Griffith D. Neal, Alameda, CA (US)

(73) Assignee: Encap Motor Corporation, Alameda, CA (US)

( * ) Notice: Subject to any disclaimer, the term of this patent is extended or adjusted under 35 U.S.C. 154(b) by 234 days.

(21) Appl. No.: 09/983,002

(22) Filed: Oct. 17, 2001

(65) Prior Publication Data

US 2003/0071382 A1 Apr. 17, 2003

(51) Int. Cl.$^7$ .......................... B29C 45/14; B29C 45/77
(52) U.S. Cl. ................ 264/40.5; 264/40.7; 264/272.14; 264/272.2; 264/279
(58) Field of Search .............................. 264/40.1, 40.5, 264/40.7, 328.1, 259, 279, 279.1, 272.11, 272.14, 272.2

(56) References Cited

U.S. PATENT DOCUMENTS

| | | | |
|---|---|---|---|
| 3,941,534 A | | 3/1976 | Hunkar |
| 4,349,324 A | | 9/1982 | Neff et al. |
| 5,556,582 A | | 9/1996 | Kazmer |
| 5,650,896 A | * | 7/1997 | Viskochil ................. 360/265.7 |
| 5,733,486 A | * | 3/1998 | Hayasi et al. .............. 264/40.1 |
| 5,800,748 A | * | 9/1998 | Kamiguchi et al. ........ 264/40.1 |
| 5,806,169 A | | 9/1998 | Trago et al. |
| 5,966,799 A | * | 10/1999 | Understiller et al. .......... 29/600 |
| 5,993,704 A | * | 11/1999 | Bader ........................ 264/40.1 |
| 6,075,304 A | * | 6/2000 | Nakatsuka .................. 310/216 |
| 6,252,746 B1 | * | 6/2001 | Cho ........................ 360/265.8 |
| 6,254,377 B1 | | 7/2001 | Kazmer et al. |
| 6,300,695 B1 | * | 10/2001 | Neal ........................ 310/68 D |
| 6,309,208 B1 | | 10/2001 | Kazmer et al. |
| 6,343,921 B1 | | 2/2002 | Kazmer et al. |
| 6,361,300 B1 | | 3/2002 | Kazmer et al. |
| 6,436,320 B1 | | 8/2002 | Kazmer et al. |
| 6,437,464 B1 | * | 8/2002 | Neal ............................ 310/43 |
| 6,464,909 B1 | | 10/2002 | Kazmer et al. |
| 6,501,616 B1 | * | 12/2002 | Neal ....................... 360/99.08 |
| 6,514,440 B1 | | 2/2003 | Kazmer et al. |
| 6,585,505 B2 | | 7/2003 | Kazmer et al. |
| 6,617,721 B1 | * | 9/2003 | Neal ........................ 310/68 D |

FOREIGN PATENT DOCUMENTS

EP 531532 * 7/1992

OTHER PUBLICATIONS

Rosato et al., Injection Molding Handbook, 3rd edition, Kluwer Academic Publishers, published 2000, pp. 112–119 and 623–715.*

Konduit, NPL A GE Plastics Company, copyright 1997–2003.*

Ryton PPS–Electrical Applications, Data Sheet, CPChem, Jan. 2003.*

\* cited by examiner

Primary Examiner—Jill L. Heitbrink
(74) Attorney, Agent, or Firm—Steven P. Shurtz; Brinks Hofer Gilson & Lione

(57) ABSTRACT

A method for injection molding a layer of phase change material around a surface of a plurality of identical motor components or hard disc drive components which includes providing a plurality of motor components or hard disc drive components; placing a motor component or hard disc drive component in a mold cavity of an injection molding machine having a controllable fill rate and a controllable injection pressure; closing said mold cavity; injecting a molten phase change material into said mold cavity at a fill rate and injection pressure; monitoring pressure in the mold cavity; controlling the fill rate of molten phase change material to obtain said motor component or hard disc drive component with the phase change material thereon, having a reproducible resonance spectrum; and repeating the above steps to produce a plurality of motor components or hard disc drive components each having a substantially uniform resonance spectrum.

7 Claims, 9 Drawing Sheets

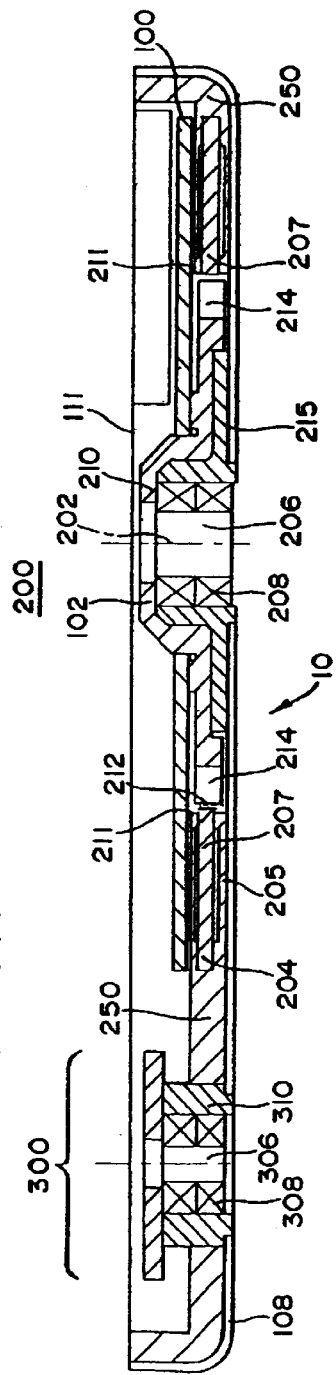
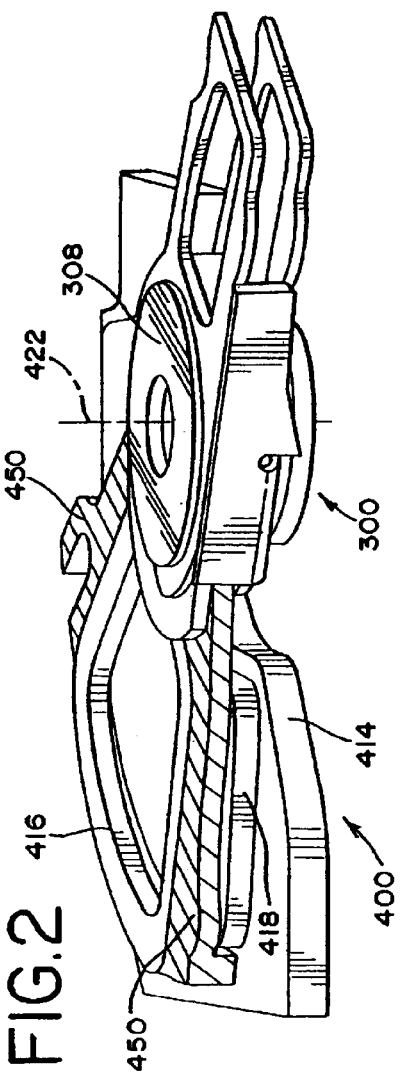
FIG.1
FIG.2

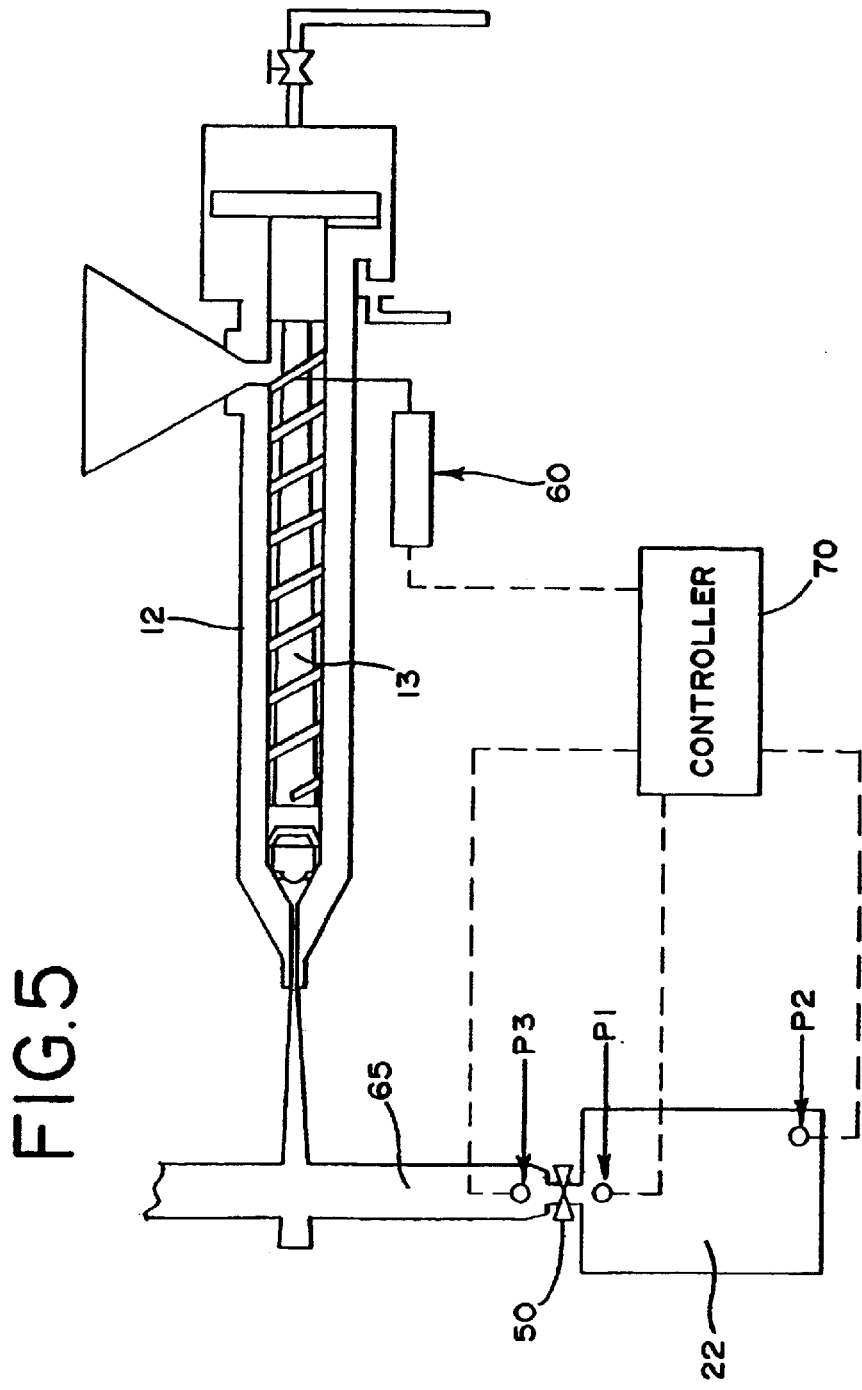

FIG. 10

TABLE I

| SAMPLE VOICE COIL MOTORS | | |
|---|---|---|
| | SAMPLE | RESONANCE (HERTZ) |
| END-OF-FILL CAVITY PRESSURE 4400-4499 PSI | 1 | 9,240 |
| | 2 | 9,272 |
| | 3 | 9,248 |
| | 4 | 9,256 |
| | 5 | 9,288 |
| | 6 | 9,296 |
| | 7 | 9,296 |
| AVERAGE | | 9,271 |
| MAX | | 9,296 |
| MIN | | 9,240 |
| SIGMA | | 23 |
| END-OF-FILL CAVITY PRESSURE 4500-4700 PSI | 1 | 9,288 |
| | 2 | 9,304 |
| | 3 | 9,280 |
| | 4 | 9,256 |
| | 5 | 9,280 |
| | 6 | 9,320 |
| | 7 | 9,256 |
| | 8 | 9,304 |
| | 9 | 9,288 |
| | 10 | 9,288 |
| | 11 | 9,248 |
| | 12 | 9,280 |
| | 13 | 9,288 |
| | 14 | 9,280 |
| AVERAGE | | 9,283 |
| MAX | | 9,320 |
| MIN | | 9,248 |
| SIGMA | | 20 |
| END-OF-FILL CAVITY PRESSURE 4701-4800 PSI | 1 | 9,296 |
| | 2 | 9,248 |
| | 3 | 9,312 |
| | 4 | 9,296 |
| AVERAGE | | 9,288 |
| MAX | | 9,312 |
| MIN | | 9,248 |
| SIGMA | | 28 |

METHOD OF ENCAPSULATING HARD DISC DRIVE AND OTHER ELECTRICAL COMPONENTS

BACKGROUND OF THE INVENTION

The present invention relates generally to hard disc drives, hard disc drive components and other electrical components having a more uniform and predictable, and in some cases modified, resonance spectrum. Particularly, it relates to the structure, construction and arrangement of hard disc drive components or other electrical components to obtain a more uniform and predictable and otherwise improved resonance spectrum.

Computers commonly use disc drives for memory storage purposes. Disc drives include a stack of one or more magnetic discs that rotate and are accessed using a head or read-write transducer. Typically, a high speed motor such as a spindle motor is used to rotate the discs. Voice coil motors are typically used in actuator assemblies to move the heads over the discs.

In many electrically motorized hard disc drive applications, significant mechanical vibration and acoustic noise is generated from both the mechanical and magnetic sources. Mechanical sources include, but are not limited to, things such as static and/or dynamic imbalance of the rotating parts, bearing elasticity and imperfections, windage, and other mechanical means of creating fluctuating forces. In an electric motor, magnetic sources include such things as the magnetostriction from commutation of the current in the electric coils, magnetic force imbalance from arrangement of the poles, slots and coils, and magnetic force imbalance due to eccentricity of the rotor and/or the stator. The vibration from mechanical and magnetic sources usually has an adverse effect on the performance of the motorized spindle. In hard disc drive applications, motor vibration creates undesirable acoustic noise, angular speed variations and data-track mis-registration. It is therefore desirable to reduce the sources of vibration as much as possible.

In hard disc drive applications, it is desirable to have a drive that has a predictable system-wide resonance. The various components in a hard disc drive have their own unique resonance spectrum when the disc drive is in operation. The combination of these resonance spectrums define the system wide resonance spectrum of the hard disc drive. Components such as voice coil motors and spindle motors have subcomponents which also have their unique resonance spectrum. The combination of the resonance spectrums of the motor subcomponents define the system wide resonance for the motor. Sometimes a particular frequency of vibration in one part can couple with the resonate frequency of another part creating a node of energy that is undesirable. As an example a motor bearing may have a defect frequency at 1250 hertz which may excite a resonate frequency of the motor bracket causing a system wide vibration of the motor assembly. Therefore it is desirable to tune the motor so that points of excitation can be manipulated to avoid this excitation phenomena. It is also common that different manufacturers install the various components in the hard disc drive. These variations in system wide resonance must be accounted for in the manufacturing process. A large range of variance in system wide resonance, is a limiting factor in designing servo control logic to drive the heads over the data, in turn limiting the ability of the heads to track the repeatable runout of the media as it spins in hard disc drives.

There is a need for design features and manufacturing techniques that serve to reduce the variance in system wide resonance and obtain a more predictable and uniform system-wide resonance for a hard disc drive and hard disc drive components. Therefore, the present invention provides a method to obtain predictable and uniform system wide resonance as much as possible and to tune the frequency of resonance to enable reductions in sympathetic system wide resonances, thereby leading to lower vibration and noise. The present invention also provides a method of enclosing components of the hard disc drive to obtain a predictable and uniform system wide resonance and to reduce both mechanical and magnetic vibration and noise.

Methods to enclose components of the hard disc drive with a synthetic resin have been suggested, but have not been used to obtain more uniform and predictable systemwide resonance. Prior art methods to mold a synthetic material enclosing hard disc drive components fail to produce a predictable system wide resonance due to several factors. First, the plastic material that is used to enclose the components has variations from lot to lot. In particular, the plastic may vary in viscosity by 60 percent from lot to lot. The molecular weight of the polymer molecules also begins to vary as heat is applied, causing the polymer molecules to become smaller, which causes variations in the viscosity of the molten polymer and stiffness of the solidified polymer. Second, the polymers exhibit non-newtonian rheology and the density of the polymer inside a mold cavity is not uniform. Third, in the past, it has not been possible to control process variables to obtain a relatively uniform volume of polymer, orientation of the polymer as it enters the mold cavity, nor ensure a uniform rate of crystallization as the polymer solidifies.

One example of an overmolded stator and a method of manufacturing such a stator is shown in U.S. Pat. No. 6,075,304 (Nakatsuka) (incorporated herein by reference). Referring to FIGS. 6 and 7 of this patent, a stator 11 is encapsulated with an overmold 12. The patent discloses that the injection speed of the polymer should be more than twice the injection speed of a standard injection molding process. The patent also discloses a molding tool capable of pressure dampening to reduce rapid pressure increase. However, this patent does not teach how to obtain predictable and uniform resonance for a hard disc drive or a hard disc drive components.

An example of a spindle motor is shown in U.S. Pat. No. 5,694,268 (Dunfield et al.) (incorporated herein by reference). Referring to FIGS. 7 and 8 of this patent, a stator 200 of the spindle motor is encapsulated with an overmold 209. The overmolded stator contains openings through which mounting pins 242 may be inserted for attaching the stator 200 to a base. U.S. Pat. No. 5,672,972 (Viskochil) (incorporated herein by reference) also discloses a spindle motor having an overmolded stator. One drawback with the overmold used in these patents is that it has a different coefficient of linear thermal expansion ("CLTE") than the corresponding metal parts to which it is attached. This patent also does not teach a method or structure for obtaining predictable and uniform resonance.

U.S. Pat. No. 5,806,169 (Trago) (incorporated herein by reference) discloses a method of fabricating an injection molded motor assembly. However, the motor disclosed in Trago is a step motor, not a high-speed spindle motor, and would not be used in applications such as hard disc drives. The patent does not disclose how to obtain uniform resonance. Thus, a need exists for an improved hard disc drive, hard disc drive components and methods for making the same that overcome the aforementioned problems.

BRIEF SUMMARY OF THE INVENTION

A hard disc drive has been invented which overcomes many of the foregoing problems. In addition, unique spindle motor assemblies, actuator assemblies and other components of a hard disc drive have been invented, as well as methods for manufacturing components for hard disc drives and other electrical components. In one aspect, the invention is a method for injection molding a layer of phase change material around a surface of each of a plurality of identical hard disc drive components which includes the steps of: providing a plurality of identical hard disc drive components; placing one of said plurality of identical hard disc drive components in a mold cavity of an injection molding machine having a controllable fill rate and a controllable injection pressure; closing said mold cavity; injecting a molten phase change material into said mold cavity at fill rates and injection pressures; monitoring pressure in the mold cavity; controlling the fill rate and/or injection pressure of said molten phase change material to obtain said hard disc drive component with the phase change material thereon; and repeating the above steps to produce said plurality of components each having a substantially uniform resonance spectrum.

In another aspect, the invention is a method of manufacturing hard disc drives having a reproducible resonance spectrum that includes the steps of providing a plurality of identical hard disc drive component sets, wherein each of said sets consists of components that are used in a single hard disc drive; placing and positioning one of said plurality of hard disc drive component sets in a mold cavity of an injection molding machine; closing said mold cavity; monitoring the pressure inside the mold cavity at an end-of-fill point; injecting a molten phase change material into said mold cavity to a pre-determined set point pressure; and repeating the steps above to produce a plurality of hard disc drives each having a substantially uniform resonance spectrum.

In yet another aspect, the invention is a method of reducing sympathetic system wide resonances of components in a hard disc drive that includes the steps of: providing a hard disc drive component; determining a desired resonance spectrum of said hard disc drive component; placing said hard disc drive component in a mold cavity of an injection molding machine having a controllable fill rate and a controllable injection pressure; closing said mold cavity; injecting a molten phase change material into said mold cavity at a fill rate and an injection pressure; monitoring the pressure in the mold cavity; and controlling the fill rate of said molten phase change material and injection pressure to obtain said hard disc drive component with the phase change material thereon, having said desired resonance spectrum.

The advantages of this invention are reduction in variance of resonance spectrums of hard disc drive and other electrical components. This reduction in variance allows hard disc drive manufacturers the ability to better design hard disc drives. Resonance spectra of electrical and hard disc drive components may also be altered to reduce sympathetic system wide resonances. Other advantages of the invention will become further apparent from the following detailed description of the presently preferred embodiments, read in conjunction with the accompanying drawings. The detailed description and drawings are merely illustrative of the invention an do not limit the scope of the invention, which is defined by the appended claims and equivalents thereof.

BRIEF DESCRIPTION OF SEVERAL VIEWS OF THE DRAWINGS

FIG. 1 is a partial cross-sectional view of a hard disc drive of the present invention.

FIG. 2 is a partial perspective view of a voice coil motor of the present invention.

FIG. 5 is a cross-sectional view of an injection molding machine that may be used to practice the present invention.

FIG. 10 is a table illustrating the first order resonance frequency for encapsulated voice coil motors of the present invention.

DETAILED DESCRIPTION OF THE DRAWINGS AND PREFERRED EMBODIMENTS OF THE INVENTION

Figure 3:
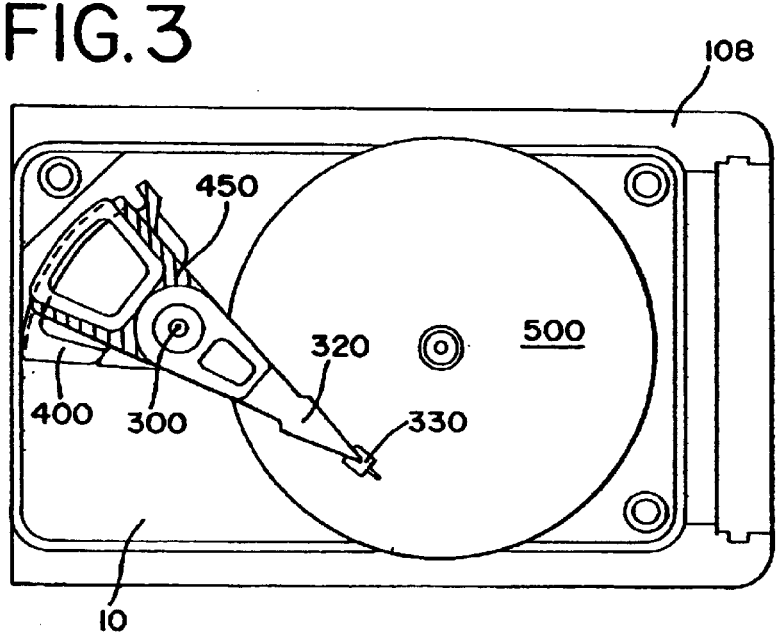
FIG. 3 is a partial perspective view of a hard disc drive with the voice coil motor of FIG. 2.

Referring to FIGS. 1 to 3, there is shown an embodiment of a product of the present invention comprising a hard disc drive system 10 having one or more parts that have a layer of phase change material thereon resulting in a more predictable system-wide resonance for the hard disc drive system 10. The hard disc drive system 10 is a combination of the hard disc drive components that make up a hard disc drive. In particular, it includes a combination of the spindle motor, base and voice coil motor of the hard disc drive.

Referring to FIG. 1, the major elements of the hard disc drive system 10 of the present invention are shown, including hard disc 100, spindle motor assembly 200, and an actuator assembly 300. These components are attached to a base portion 108 of a housing. The base plate 108 is preferably made of stamped steel. A shell portion forms a cover 111, and in conjunction with the base portion 108, encloses the aforementioned disc drive components.

The disc 100 has a centrally located aperture through which a hub 102 extends. The hard disc 100 is rotatably supported on the hub 102, which is an integral part of the rotor 210 of spindle motor assembly 200. In the preferred embodiment of the present invention and as depicted in FIG. 1, one concentrically aligned disc 100 is positioned on the hub 102. The disc drive depicted is a single disc system; however, to increase storage capability, multi-disc systems are foreseeable.

As depicted in FIG. 1, the hard disc 100 is preferably rotated by the spindle motor assembly 200. In addition to integral hub 102, the spindle motor 200 includes a stator 204, a rotor 210, a shaft 206, and bearings 208. The stator 204 has a plurality of poles 207 with wire windings 205. The wire windings 205 serve as conductors and induce or otherwise create a plurality of magnetic fields when electrical current is conducted through the conductors.

In the present embodiment, the integral hub 102 is fixedly mounted to shaft 206 forming the axis of rotation of the motor 202. The shaft 206 is mounted to the base plate 108 by gluing or other conventional mounting means. Bearings 208 are journalled about the shaft 206 and support rotor 210 comprised of the hub 102 and a permanent magnet 214 positioned on a outer surface of the hub 102 facing the stator 204. The interaction of a magnetic field generated by the stator 204 with the rotor permanent magnets 214 propels the rotor 210 to spin. The rotor 210, having the hub 102 as an integral component, rotates the hard disc 100. In the preferred embodiment shown in FIG. 1, there is also a housing 215 that houses bearing supports 208 and shaft 206. The base 215 is not essential to practice the invention and can be removed, and instead the hub 102 can be used to house the bearing supports 208 and shaft 206. Other motor configurations that can be manufactured using concepts of the present invention are disclosed in U.S. Pat. No. 6,300,695 issued Oct. 9, 2001, incorporated herein by reference.

The actuator assembly 300 has a voice coil motor 400, as illustrated in FIG. 2, that drives an actuator arm 320 (FIG. 3) to pivot and swing back and forth over the disc surface 500 to read and write data. The actuator assembly arm 320 is attached to a shaft 306 at one end. The other end of the actuator arm has a head 330 that reads and writes data. The shaft 306 is mounted to the base plate 108 by gluing or other conventional mounting means. Bearings 308 are journalled about the shaft 306. The bearing supports 308 and shaft 306 are housed in a metal housing 310. The metal housing 310 is preferably made of steel.

Referring to FIG. 1, a monolithic body 250 of phase change material is injection molded onto the non-moving components of the hard disc drive system 10. Although the embodiment in FIG. 1 shows all of the non moving parts injection molded with a monolithic body of phase change material, one of ordinary skill in the art will understand that any combination of parts may be unitized with a monolithic body of phase change material to help obtain a predictable system-wide harmonic resonance for the unitized parts.

As shown in FIG. 2, an actuator motor or voice coil motor 400 is substantially encapsulated with a monolithic body 450 of phase change material to unitize the non-moving subcomponents of the actuator motor 400. Substantially encapsulated means that the monolithic body surrounds enough surface area of a component so that it effectively alters the resonance spectrum of that component to a single resonance spectrum or to a desired resonance spectrum. A pole piece 414 is disposed beneath the portion of actuator 300 which incorporates coil 416, and which in cooperation with magnet 418 and pole piece 414, functions to drive actuator 300 about bearing 308 and pivot axis 422. The monolithic body 450 unitizes the subcomponents of the actuator motor. The unitized subcomponents behave as a single component and have the same resonance spectrum and vibrational characteristics. FIG. 3 illustrates a perspective view of a hard disc drive showing the placement of actuator 300 in a hard disc drive. The unitized actuator motor formed by the method of injection molding of the present invention has a reproducible resonance spectrum.

Figure 4A:
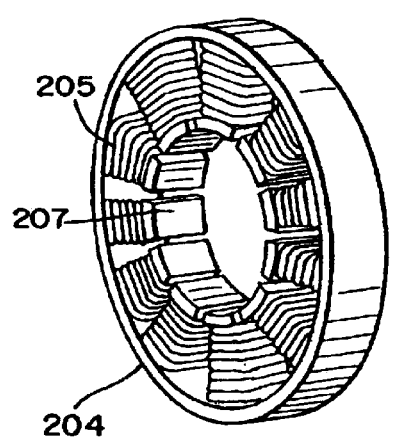
FIG. 4a is a perspective view of a stator.
Figure 4B:
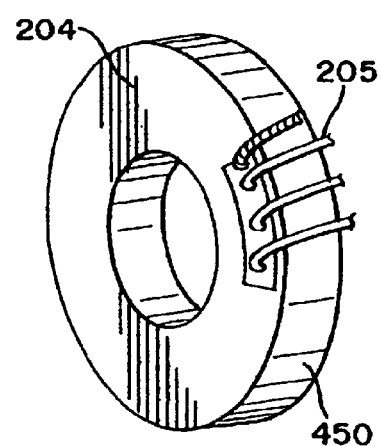
FIG. 4b is a perspective view of a stator substantially encapsulated in a monolithic body of phase change material of the present invention.

Illustrated in FIG. 4a is a stator 204 having a plurality of poles 207 with wire windings 205. As illustrated in FIG. 4b, in another embodiment of the present invention, only the stator 204 is substantially encapsulated with a monolithic body 450 of phase change material with the method of the present invention to obtain a stator assembly 216 having a reproducible resonance spectrum.

The phase change material used to make the body is preferably a thermally conductive but non-electrically conductive plastic. In addition, the plastic preferably includes ceramic filler particles that enhance the thermal conductivity of the plastic while improving the loss factor or ability to damp vibration. A preferred form of plastic is polyphenyl sulfide (PPS) sold under the trade name "Konduit" by LNP. Grade OTF-212 PPS is particularly preferred. Examples of other suitable thermoplastic resins include, but are not limited to, thermoplastic resins such as 6,6-polyamide, 6-polyamide, 4,6 polyamide, 12,12-polyamide, and polyamides containing aromatic monomers, polybutylene terephthalate, aromatic polyesters, liquid crystal polymers, polycyclohexane dimethylol terephthalate, copolyetheresters, polyphenylene sulfide, polyacrylics, polypropylene, polyethylene, polyacetals, polymethylpentene, polyetherimides, polycarbonate, polysulfone, polyethersulfone, polyphenyloxide, polystyrene, styrene copolymer, mixterus and graft copolymers of styrene and rubber, and glass reinforced or impact modified versions of such resins. Blends of these resins such as polyphenylene oxide and polyamide blends, and polycarbonate and polybutylene terephthalate, may also be used in the invention.

The hard disc drive components of one embodiment of the present invention are insert molded with a monolithic body of a phase change material that unitizes the subcomponents of the hard disc drive components. The hard disc drive system has a body of phase change material that unitizes some or all non-moving components of the hard disc drive.

The hard disc drive and its motor assemblies include one or more, and generally a plurality of solid parts to be used in the motor either near or within the body, such as bearings and inserts. In addition, there are solid parts that are near the body, such as a disc support member and a hard disc drive base. The preferred method of developing the hard disc drive comprises designing a phase change material to have a coefficient of linear thermal expansion such that the phase change material contracts and expands at approximately the same rate as the one or more solid parts. For example, the preferred phase change material should have a CLTE of between 70% and 130% of the CLTE of the core of the stator. The phase change material should preferably have a CLTE that is intermediate the maximum and minimum CLTE of the solid parts where the body is in contact with different materials. Also, the CLTE's of the body and solid part(s) should preferably match throughout the temperature range of the motor during its operation. An advantage of this method is that a more accurate tolerance may be achieved between the body and the solid parts because the CLTE of the body matches the CLTE of the solid parts more closely.

Most often the solid parts will be metal, and most frequently steel, copper and aluminum. The solid parts could also include ceramics. In almost all motors there will be metal bearings. Thus it is preferred that the phase change material have a CLTE approximately the same as that of the metal used to make the bearings.

Most thermoplastic materials have a relatively high CLTE. Some thermoplastic materials may have a CLTE at low temperatures that are similar to the CLTE of metal. However, at higher temperatures the CLTE does not match that of the metal. A preferred thermoplastic material will have a CLTE of less than $2\times10^{-5}$ in/in° F., more preferably less than $1.5\times10^{-5}$ in/in° F., throughout the expected operating temperature of the motor, and preferably throughout the range of 0° F. to 250° F. Most preferably, the CLTE will be between about $0.8\times10^{-5}$ in/in° F. and about $1.2\times10^{-5}$ in/in° F. throughout the range of 0° F. to 250° F. When the measured CLTE of a material depends on the direction of measurement, thickness of the sample, or conditions of molding, the relevant CLTE for purposes of defining the present invention is the CLTE of an encapsulated component in the direction in which the CLTE is lowest. Preferably, the CLTE in other directions is not more than 4 times the lowest value. The CLTE values are measured by a standard ASTM test method where the phase change material has the shape and form of the monolithic body that is overmolded on a component. The CLTE of common solid parts used in a motor are as follows:

|  | 23° C. | 250° F. |
| --- | --- | --- |
| Steel | 0.5 | 0.8 ($\times 10^{-5}$ in/in ° F.) |
| Aluminum | 0.8 | 1.4 |
| Ceramic | 0.3 | 0.4 |

Of course, if the motor is designed with two or more different solids, such as steel and aluminum components, the CLTE of the phase change material would preferably be one that was intermediate the maximum CLTE and the minimum CLTE of the different solids, such as 0.65 in/in° F. at room temperature and $1.1\times10^{-5}$ in/in° F. at 250° F.

One preferred thermoplastic material, Konduit OTF212-11, was made into a thermoplastic body and tested for its coefficient of linear thermal expansion by a standard ASTM test method. It was found to have a CLTE in the range of −30 to 60° C. of $1.09\times10^{-5}$ in/in° F. in the X direction and $1.26\times10^{-5}$ in/in° F. in both the Y and Z directions, and a CLTE in the range of 100 to 240° C. of $1.28\times10^{-5}$ in/in° F. in the X direction and $3.16\times10^{-5}$ in/in° F. in both the Y and Z directions. (Hence, the relevant CLTEs for purposes of defining the invention are $1.09\times10^{-5}$ in/in° F. and $1.28\times10^{-5}$ in/in° F.) Another similar material, Konduit PDX-0988, was found to have a CLTE in the range of −30 to 30° C. of $1.1\times10^{-5}$ in/in° F. in the X direction and $1.46\times10^{-5}$ in/in° F. in both the Y and Z directions, and a CLTE in the range of 100 to 240° C. of $1.16\times10^{-5}$ in/in° F. in the X direction and $3.4\times10^{-5}$ in/in° F. in both the Y and Z directions. By contrast, a PPS type polymer, (Fortron 4665) was likewise tested. While it had a low CLTE in the range of −30 to 30° C. ($1.05\times10^{-5}$ in/in° F. in the X direction and $1.33\times10^{-5}$ in/in° F. in both the Y and Z directions), it had a much higher CLTE in the range of 100 to 240° C. ($1.94\times10^{-5}$ in/in° F. in the X direction and $4.17\times10^{-5}$ in/in° F. in both the Y and Z directions).

In addition to having a desirable CLTE, the preferred phase change material will also have a high thermal conductivity. A preferred thermoplastic material will have a thermal conductivity of at least 0.7 watts/meter° K using ASTM test procedure F 433 and tested at room temperature (23° C.).

Referring to FIG. 5, an injection molding machine is used to manufacture a hard disc drive or hard disc drive components having a reproducible resonance spectrum. The injection molding machine is similar to the machines used conventionally in thermoplastic injection molding processes. A unique aspect of this invention is the method for injection molding a layer of phase change material onto the hard disc drive or hard disc drive components. The injection molding apparatus suitable for use in the method provided by the present invention comprises an injection cylinder 12 having a resin feeding screw 13 inside, a mold cavity 22, an runner 65, a stroke sensor 60 and pressure transducers P1, P2 and P3.

The molten material flows into the mold cavity 22 via runners 65. Gates are placed at the end of the runner to control the flow of molten material into the mold cavity. Valve gate 50 opens and closes the runner 65 to the cavity 22. Suitable valve gates are any valves known in the injection molding art.

However, it is also possible to perform the method of the present invention without the use of a valve gate. In a process where no valve gates are used, the molten material is kept at a predetermined pressure in the mold cavity and is allowed to solidify. The mold cavity is opened and the part and the solidified material in the runner are ejected and then separated. The use of a valve gate eliminates the need for the separating step.

Figure 6A:
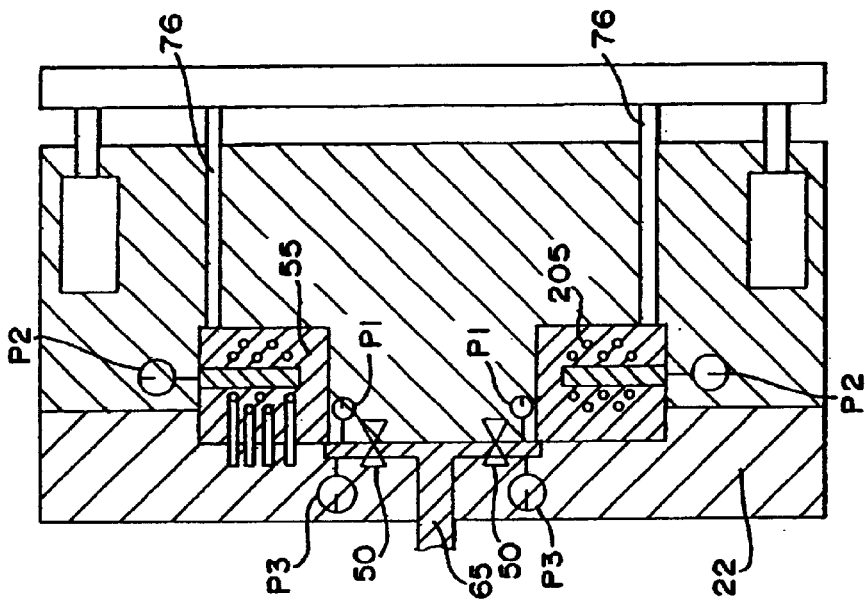
FIGS. 6a and 6b are cross-sectional views in open and closed positions of a mold cavity that could be used with the injection molding machine of FIG. 5.
Figure 6B:
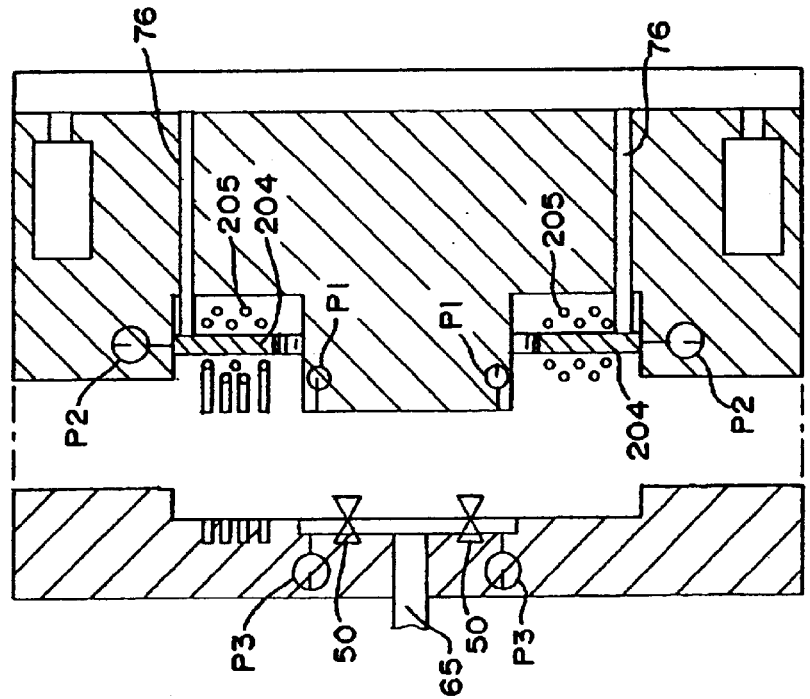

In a preferred embodiment, a hard disc drive component such as a voice coil motor, spindle motor or stator is insert molded with a monolithic body of phase change material to obtain a component with a reproducible resonance spectrum. In the alternative, a hard disc drive with a base, spindle motor assembly and actuator assembly can be insert molded with a monolithic body of phase change material to obtain a reproducible resonance spectrum. In one embodiment, as illustrated in FIG. 6a and FIG. 6b, a stator is placed into a mold cavity 22. The mold cavity is designed to hold the stator and form a predetermined shape. Retractable pins 76 hold the stator in place during the injection molding process. They are later retracted once the mold cavity is filled with phase change material. The injection molding method begins with closing the mold cavity as illustrated in FIG. 6b and opening the valve gates 50. Molten material 55 fills cavity 22. A stroke sensor 60 measures the rate of plastic injection. A controller 70 correlates this rate, the compressibility of the plastic and the size of the injection unit to determine a quantity of plastic injected with time. A pressure transducer P1 is associated with the beginning-of-fill point and is placed near the gate 50 of the mold cavity 22. The beginning-of-fill point is the first portion of a mold cavity that is filled by molten material. Thus, the pressure transducer P1 is preferably placed within the first ten percent of the mold cavity to be filled by molten material. Another pressure transducer P2 is associated with the end-of-fill point in cavity 22. The end-of-fill point is the last portion of a mold cavity that is filled by molten material. Thus, the pressure transducer P2 is preferably placed within the last ten percent of the mold cavity to be filled by molten material. Also a pressure transducer P3 is placed in the runner 65 to monitor the runner pressure. The stroke sensor 60, as illustrated in FIG. 5, measures the fill rate of the molten phase change material.

Molten material enters through the gate and quickly fills up the entire cavity. The stroke sensor 60 and pressure transducers P1, P2, and P3 transmit their respective readings to a controller 70, as illustrated in FIG. 5, which is preferably used in the method of the present invention. The controller 70 uses the pressure and stroke readings to determine whether to increase or decrease injection pressure and fill rate to achieve a desired fill profile and pressure gradient. FIG. 9d illustrates an example of a pressure profile at the various pressure transducers for the present invention. Additionally the controller can be used to close valve gate 50 and to stop the flow of molten material into the cavity 22. The controller reduces the flow of molten material when the pressure at the end-of-fill point inside cavity 22 reaches a set point pressure. If valve gates are not utilized, the controller maintains a constant injection pressure until the material in the runner to and mold cavity have solidified. When the pressure at the end-of-fill point inside cavity 22 reaches the set point pressure, the molten material is allowed to cool and solidify. Although the embodiment described above uses only one cavity, it is contemplated that multiple mold cavities maybe utilized to simultaneously carry out the method of the present invention.

Figure 7:
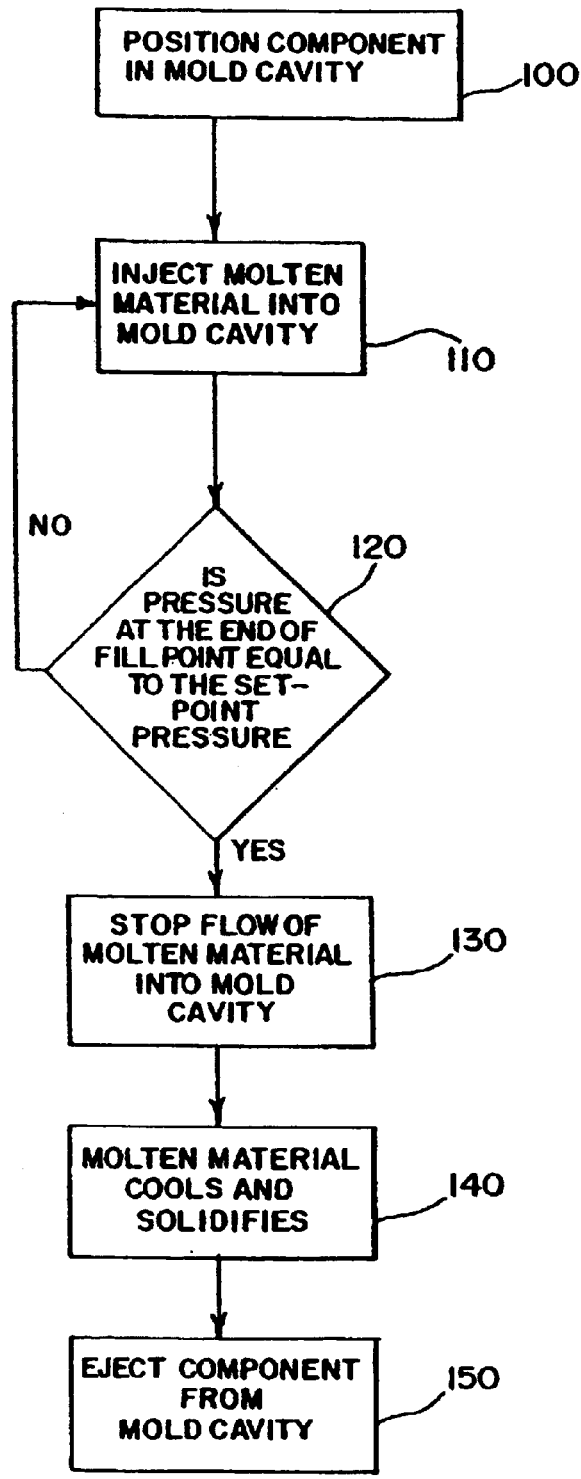
FIG. 7 is a flowchart illustration of the preferred injection molding process of the present invention.

FIG. 7 is a flowchart illustration of the injection molding process of the present invention. It will be understood that each step of the flowchart illustration can be implemented by computer program instructions or can be done manually. These computer program instructions may be loaded onto a computer or other programmable data processing apparatus to produce a machine, such that the instructions which execute on the computer or other programmable data processing apparatus create means for implementing the functions specified in the flowchart step. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart step. The computer program instructions may also be loaded onto a computer or other programmable data processing apparatus to cause a series of operational steps to be performed on the computer or other programmable data processing apparatus to produce a computer implemented process such that the instructions which execute on the computer or other programmable apparatus provide steps for implementing the functions specified in the flowchart step.

It will be understood that each step of the flowchart illustration can be implemented by special purpose hardware-based computer systems which perform the specified functions or steps, or combinations of special purpose hardware and computer instructions, or can be done manually.

An injection molding machine utilizing an injection molding process for the present invention may have a single or multiple mold cavities. The process begins with step 100 by positioning the hard disc drive and or its component(s) into the mold cavities. The cavity is then injected with molten material using a resin feeding screw at a predetermined fill rate in step 110. The fill rate is monitored and controlled to maintain a desired viscosity. The time it takes to fill the cavity to the set-point pressure depends on the size of the cavity and the injection rate. In a preferred embodiment where a phase change material is molded around the surface of a voice coil motor, the injection rate is high. For example for overmolding a voice coil motor the injection rate is about 25 cm$^3$/sec at its maximum and it takes about 0.2 seconds to fill the cavity to the set point pressure. In step 120, the pressure at the end-of-fill point inside the cavity is measured and compared to the set-point molding pressure. The set-point pressure is predetermined based on the size, shape and properties of the phase change material and the materials of the hard disc drive components. For injection molding a thermoplastic material on a voice coil motor for example, the set-point pressure is preferably about 3,500 PSI. The process goes back to step 110 if the pressure at the end-of-fill point inside the cavity is less than the set-point molding pressure. As the pressure inside the cavity approaches and reaches the set-point pressure, the injection pressure, commonly referred to as packing pressure, is reduced in step 130. Because of pressure drops across the runner and gate into the cavity, the injection pressure is usually much higher than the cavity pressure. After all of the cavities are full at the set-point pressure, a constant packing pressure is maintained and the molten material inside the cavities is allowed to cool and solidify in step 140. The injection molding process ends with step 150, when the components are ejected from the molding cavities.

Figure 8:
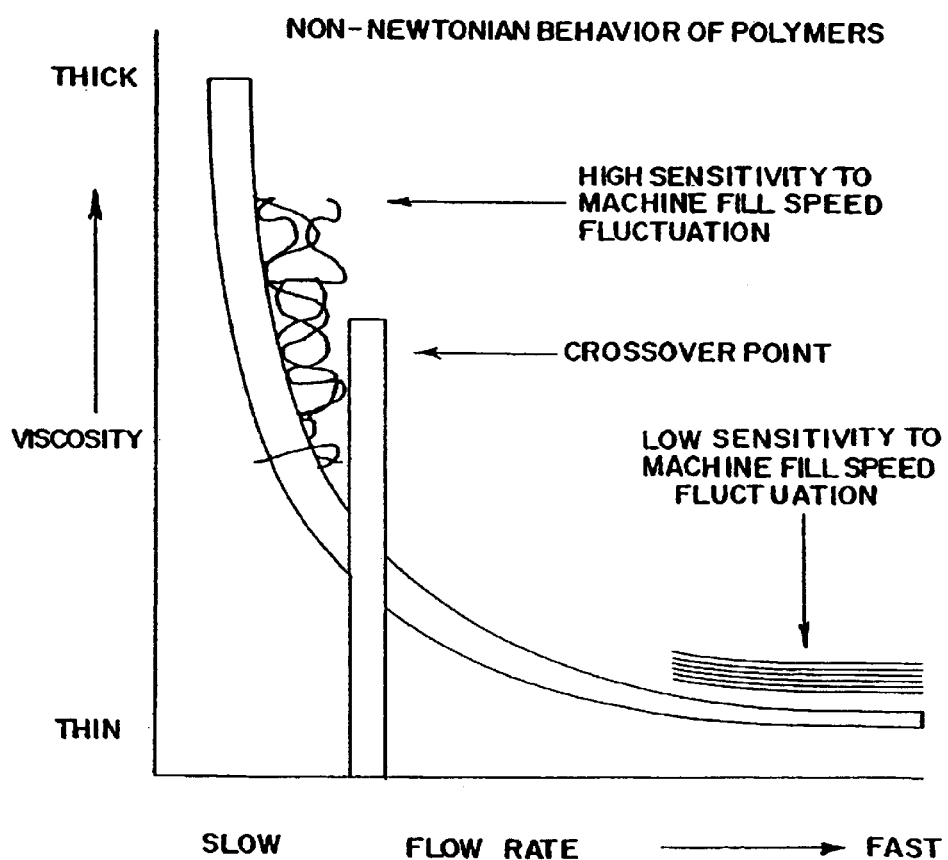
FIG. 8 is a graph illustrating the relationship between viscosity and flow rate for preferred polymers used in practicing the present invention.

By measuring the pressure at the end-of-fill point and holding the pressure inside the cavity at the set-point pressure, the phase change material will have more uniform density. Furthermore, the pressure gradient across the cavity is also more uniform and does not vary significantly. The phase change materials used to form the monolithic body are preferably plastics. Plastics are made of long polymer chain molecules which cause them to behave in a non-newtonian manner. As illustrated in FIG. 8, non-newtonian behavior with plastic materials is characterized by the fact that their viscosities change dramatically with shear rate. Changes in injection rate or gate size can impact viscosity and thus cavity fill rate and the cavity pressure gradient. Additionally, materials vary in viscosity from lot to lot when manufactured and can degrade with the presence of moisture or excess temperature. Thus it is important to take advantage of this shear thinning to modify the rheology from lot to lot to a specific target value. Consequently, when all the parameters, such as the fill rate and injection pressure are set the same, parts can vary dramatically from lot to lot. As explained in the background, due to the nature of long chain molecules and the polymerization process, there are inherently large variations in the process even when machine conditions are held constant. However, variables such as pressure, temperature, flow rate and cooling rate do influence the properties of the phase change material which correlate to the finished part properties. By monitoring these variables, part characteristics can be accurately and consistently predicted.

Each of the variables of the plastic injection molding process directly or indirectly affect other variables which account for most variations in the finished part. For instance, changing the barrel temperature on an injection molding machine would also affect the ability of the material to transmit pressure into the mold, and thus the plastic pressure is changed. As the material is heated, it becomes less viscous and thus the flow rate increases. Also, by increasing the temperature the cooling rate is affected, since the cooling rate is a function of plastic temperature and mold temperature. Thus the injection molded variables are not well isolated or controlled.

Mold cavity pressure, however, has been found to be the most important indicator of molded part dimensions and weight. Plastic pressure in the mold cavity, however, cannot be expressed as a single figure for the mold, but rather as a profile across the mold cavity. This profile begins at the beginning-of-fill point and continues to the end-of-fill point. The flow restriction caused by the mold cavity and insert geometry cause a pressure drop between the first and last areas to fill with plastic. Thus the pressure is slightly different at different points in the mold cavity. This gradient can cause non-uniformity of the phase change material across the mold cavity. Uniformity of the properties of the phase change material is critical to obtaining a reproducible resonance spectrum. Therefore it is important to ensure that the pressure gradient inside the cavity is minimized and is reproducible for each shot.

It has been found that using pressure transducers at the beginning-of-fill and end-of-fill points and measuring the injection rate can provide a basis for intelligent decision making when coupled with monitoring of the injection pressure and fill rate in the injection molding machine. With these four readings, one can determine the pressure gradient across the system and can alter other system variables to obtain a target pressure profile across the mold cavity.

The pressure profile in the mold derived from transducers at the beginning-of-fill and at the end-of-fill points provide the greatest degree of insight into part quality. Because plastic is compressible at one half to three quarters of a percent per thousand PSI, this cavity pressure profile gives a measure of how the plastic is compressed across the mold. After post-mold stabilization, which occurs sometime between 6 hours to 6 days after the part is removed from the mold, parts achieve constant density. Because material density varies across the mold prior to stabilization, due to the pressure profile, stabilized parts will change size in varying amounts across the part in order to reach their stable constant densities. If the pressure profile is kept uniform from part to part, the density of the plastic is also quite uniform from part to part. This maintains the desired shape of the plastic after stabilization and also retains its predicted spectrum of resonance after stabilization for each part. Thus, in order to obtain a uniform pressure profile, the pressure is preferably measured at the end-of-fill point until it reaches a pre-determined set point pressure. At that point the flow rate is decreased and the molten material is held inside the cavity at the pre-determined set point pressure to obtain a target pressure profile inside the cavity and allowed to cool and solidify.

The cavity pressure profile is influenced by not only the injection pressure applied by the injection molding machine, but also by the fill time, temperature of the plastic and temperature of the mold. In a preferred embodiment, the fill time is also monitored and controlled to keep a constant viscosity of the molten phase change material. The preferred fill time can be determined by comparing fill times of parts known to be good during initial quality control studies on the mold. Cavity pressure profile with fill time held constant is a function of the apparent viscosity of the material, the melt temperature, and the mold temperature. The temperature can be monitored and controlled through the use of thermocouples. Due to the non-newtonian characteristics of plastic, the fill time is preferably kept relatively low, for example less than a second, with a high flow rate to decrease the viscosity of the plastic and obtain a more uniform pressure profile. For phase change materials having ceramic filled particles, keeping the viscosity low also helps prevent agglomeration of the particles, which can affect the system wide resonance spectrum of the component.

Figure 9A:
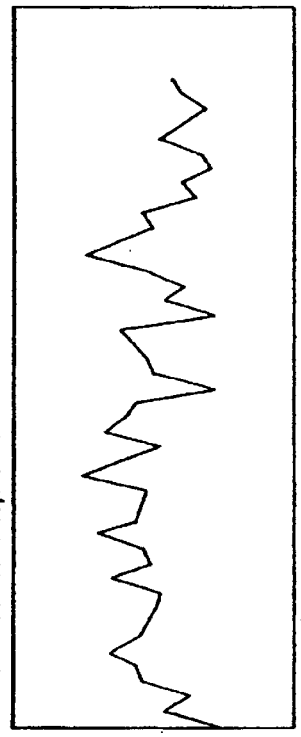
FIG. 9a is a graph illustrating the pressure at the end-of-fill point for multiple cycles for an example injection molding process without control.
Figure 9B:
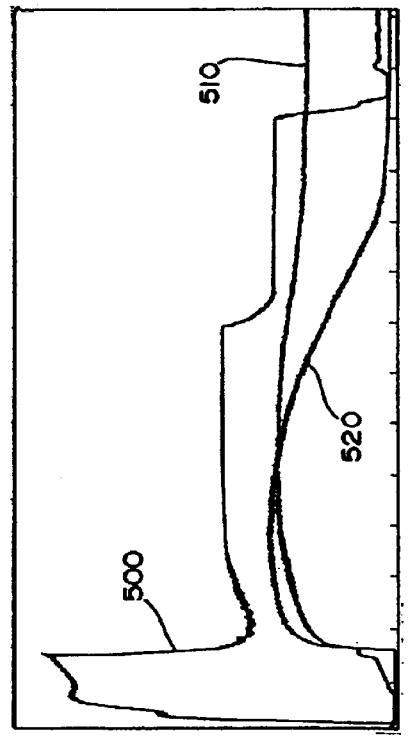
FIG. 9b is a graph illustrating the relationship between pressure and time in the runner and mold cavity for an example injection molding process without control.
Figure 9C:
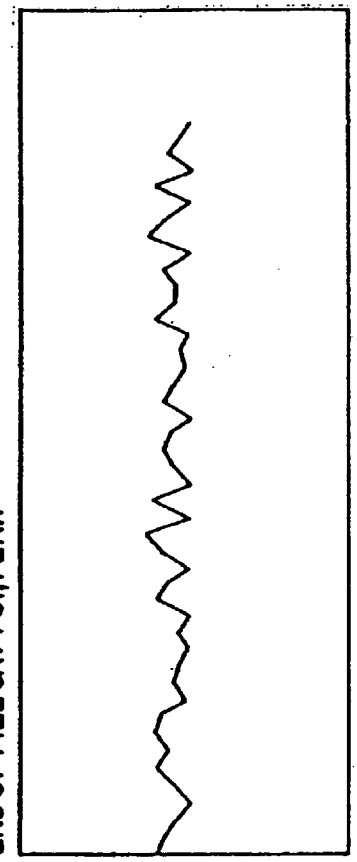
FIG. 9c is a graph illustrating the pressure at the end-of-fill point for multiple cycles for an example injection molding process of the present invention.
Figure 9D:
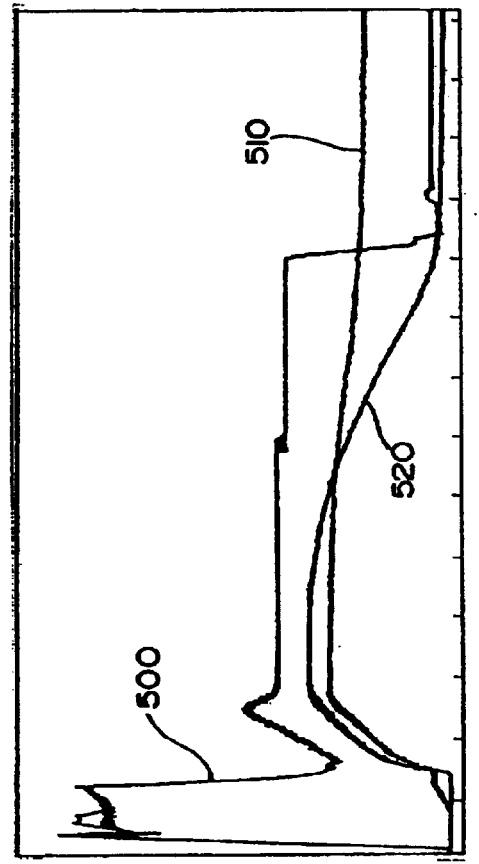
FIG. 9d is a graph illustrating the relationship between pressure and time in the runner and mold cavity for an example injection molding process of the present invention.

FIGS. 9a–9d illustrate the difference between a process that does not use control with the controlled process of the present invention. In an uncontrolled process the parameters are not controlled to ensure that the end-of-fill pressure reaches a predetermined set point pressure with every shot. FIG. 9a illustrates a graph showing the end-of-fill pressure for various shots in an uncontrolled process. Each peak and valley point on the graph represents the end-of-fill pressure for a single shot. As can be seen, in an uncontrolled process, the end-of-fill pressure varies considerably from shot to shot.

FIG. 9c illustrates the end-of-fill pressure of a controlled process of the present invention. Each peak and valley point on the graph represents the end-of-fill pressure for a shot. As can be seen, in the controlled process of the present invention, the end-of-fill pressure is relatively constant from shot to shot. The maintenance of this uniformity of the end-of-fill pressure from shot to shot is a significant contributing factor to the ability of obtaining a reproducible resonance spectrum.

FIGS. 9b and 9d illustrate the pressure profiles of the injection pressure 500, beginning-of-fill pressure 510 and end-of-fill pressure 520 without control and with control respectively. As can be seen, the injection pressure 500 is higher than both the beginning-of-fill pressure 510 and the end-of-fill pressure 520. Once the cavity is nearly filled with molten material, the injection pressure 500 is reduced and the pressure at the beginning-of-fill begins to rise. Once the cavity is full, the injection pressure is kept constant and the end-of-fill pressure rises to the predetermined set point pressure, in the case with control. The part is then allowed to cool and solidify, which causes a significant decrease in the end-of-fill pressure.

By injection molding a phase change material on one or a set of hard disc drive components in accordance with the method of the present invention, it has been found that one could obtain a reproducible resonance spectrum for the molded components. All components have a resonance spectrum. The resonance spectrum of a component can be measured using the industry standard "ping" test. To perform the ping test, the component placed in a clamp next to a microphone or it can be placed in an acoustic chamber. The component is then hit with an impact hammer. A signal processor then measures the harmonic oscillations of the component. A component will have a resonance spectrum that will be defined by peaks at different orders. The first order frequency for a component has the highest energy emission peak.

Shown in FIG. 10 is a table that shows the first order frequency resonance of an encapsulated voice coil motor obtained through the ping test. The data in the table is from parts molded in three different runs. In one run of seven parts, the end-of-fill pressure was held in the range of 4400–4499 psi. In a second run of fourteen parts, the end-of-fill pressure was controlled to be in the range of 4500–4700 psi. In the third run of four parts, the end-of-fill pressure was controlled to be in the range of 4701–4800 psi. Each part (specimen) was subjected to the ping test and its first order harmonic resonance frequency was determined. The results are recorded in Table I, along with the average, maximum, minimum and standard deviation ($\Sigma$) of the resonance frequency of the first order harmonic of the parts produced in that run. The median first order frequency is the median value of all first order frequencies for a batch of identical components molded under a controlled profile. One should understand that by identical components, it is meant that the components are all the same type of component and that they are produced through the same manufacturing process from the same manufacturer. It does not mean that the components are identical down to the microscopic level.

A reproducible resonance spectrum for the present invention is defined such that a batch of one hundred components made by the method of the present invention would have a standard deviation of first order frequency that is less than about 300 Hertz. Preferably the standard deviation is less than about 100 Hertz, more preferably less than about 50 Hertz, and most preferably about 30 Hertz or less. It should be noted that in the data reported in Table I, the standard deviation is only about 20 to 30 Hertz at three different end-of-fill pressures.

The standard deviation of first order resonance frequency is preferably at least about twenty-five percent less, and more preferably at least about fifty percent less, than the standard deviation of first order resonance frequency for a batch of components overmolded without the method of the present invention. Conventional injection molding processes control the injection pressure and either the injection time or the stroke of the extrusion screw in the injection molding machine. For example in a conventional process, the injection pressure will be set and then the molten material is injected into the mold cavity for a fixed time or a fixed stroke distance of the extrusion screw.

Such methods have yielded voice coil assemblies that have a standard deviation resonance spectrum that is about 300 Hertz. With the method of the present invention it has been found that a standard deviation, for a component such as a voice coil motor, that is preferably less than about thirty Hertz may be obtained.

Another advantage of the present invention is that a resonance spectrum of a component may be altered to avoid sympathetic system wide resonances of components in a hard disc drive. It is also interesting to note that the average resonance for the data in Table I gets progressively higher with higher end-of-fill pressures. To modify a resonance spectrum of a component a suitable phase change material is selected and the component is overmolded with a layer of phase change material in accordance with the method of the present invention. The proper injection pressure and fill rate necessary to obtain the desired resonance spectrum are then determined. The resonance spectrum is then evaluated. If points of sympathetic excitation are noted, the density of the encapsulated part is altered via changing cavity pressure to a new value. Once an acceptable structure is defined, the process settings are determined. The ability to control the pressure and fill rate, and monitor other parameters of the injection molding process in accordance with the method of the present invention, provide an ability to reproduce the desired resonance spectrum with every molding cycle.

With a predictable system wide resonance, hard disc drive manufacturers can utilize predictable system wide resonance hard disc drive components to better design more compact hard disc drives that produce less noise or vibration. Furthermore, the actuator position can be adjusted to follow the various positions of the media data tracks induced by vibrations by using a servo control. By reducing the variability of the frequency of these vibrations, manufacturers are able to control the actuator with more accuracy, thus leading to the ability to place more data tracks closer together. This offers the benefit of more storage per media disc.

It is contemplated that numerous modifications may be made to the components and methods of the present invention without departing from the spirit and scope of the invention as defined in the claims. For example, the method of the present invention can be used for other motors and components besides hard disc drive components. Motors used in the automotive industry such as windshield wiper motors, integral starter/alternators, drive motors for hybrid electric vehicles, appliance motors for clothes washers and dish washer and components of such motors can be encapsulated with a phase change material to reduce vibrational noise and obtain more reproducible resonance spectrums. Accordingly, while the present invention has been described herein in relation to several embodiments, the foregoing disclosure is not intended or to be construed to limit the present invention or otherwise to exclude any such other embodiments, arrangements, variations, or modifications and equivalent arrangements. Rather, the present invention is limited only by the claims appended hereto and the equivalents thereof.

What is claimed is:

1. A method of reducing sympathetic resonances of a component in a hard disc drive comprising:
   a) providing a hard disc drive component;
   b) determining a desired resonance spectrum of frequencies to avoid for said hard disc drive component;
   c) placing said hard disc drive component in a mold cavity of an injection molding machine having a controllable fill rate and a controllable injection pressure;
   d) closing said mold cavity;
   e) injecting a molten phase change material into said mold cavity;
   f) monitoring and controlling the pressure in the mold cavity; and
   g) monitoring and controlling one or more of the fill rate of said molten phase change material and injection pressure to obtain said hard disc drive component with the phase change material thereon, having said desired resonance spectrum.

2. The method of claim 1 wherein said desired resonance spectrum is achieved by tuning the fill rate and pressure to a predetermined set-point fill rate and a predetermined set-point pressure.

3. The method of claim 1 wherein the step of controlling the pressure in the mold cavity is accomplished by opening and closing one or more valve gates associated with said cavity.

4. A method of producing a motor component with a desired resonance spectrum comprising:
   a) providing a motor component;
   b) determining a desired resonance spectrum;
   c) placing said motor component in a mold cavity;
   d) closing said mold cavity;
   e) injecting a molten phase change material into said mold cavity;
   f) monitoring and controlling the pressure in the mold cavity; and
   g) monitoring and controlling one or more of a fill rate and an injection pressure of said molten phase change material to obtain said motor component with the phase change material thereon, having said desired resonance spectrum.

5. The method of claim 4 wherein the step of controlling the pressure in the mold cavity is accomplished by opening and closing one or more valve gates associated with said cavity.

6. A method of producing an electrical device with a subcomponent having a desired resonance spectrum comprising:
   a) providing a subcomponent of said electrical device;
   b) determining a desired resonance spectrum of that subcomponent;
   c) placing said subcomponent in a mold cavity;
   d) closing said mold cavity;
   e) injecting a molten phase change material into said mold cavity;
   f) monitoring and controlling the pressure in the mold cavity;
   g) monitoring and controlling one or more of a fill rate and an injection pressure of said molten phase change material to obtain said subcomponent with the phase change material thereon, having said desired resonance spectrum; and
   h) assembling said electrical device using said subcomponent.

7. The method of claim 6 wherein the step of controlling the pressure in the mold cavity is accomplished by opening and closing one or more valve gates associated with said cavity.

* * * * *